US007818197B2

(12) United States Patent
Cho et al.

(10) Patent No.: US 7,818,197 B2
(45) Date of Patent: Oct. 19, 2010

(54) SCHEDULE MANAGEMENT APPARATUS, SCHEDULE MANAGEMENT METHOD AND PROGRAM

(75) Inventors: Kenta Cho, Tokyo (JP); Masanori Hattori, Kawasaki (JP); Yuzo Okamoto, Yokohama (JP); Masayuki Okamoto, Kawasaki (JP); Tomohiro Yamasaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1357 days.

(21) Appl. No.: 11/289,535

(22) Filed: Nov. 30, 2005

(65) Prior Publication Data

US 2006/0136280 A1    Jun. 22, 2006

(30) Foreign Application Priority Data

Nov. 30, 2004    (JP)    ............................. 2004-347105

(51) Int. Cl.
*G06F 9/46*    (2006.01)
(52) U.S. Cl. ........................... 705/9; 709/226; 718/100; 718/107
(58) Field of Classification Search ........................ None
See application file for complete search history.

(56) References Cited

U.S. PATENT DOCUMENTS

| 5,621,898 | A | * | 4/1997 | Wooten | ..................... | 710/117 |
| 5,907,829 | A | * | 5/1999 | Kida | .............................. | 705/9 |
| 6,317,774 | B1 | * | 11/2001 | Jones et al. | ................. | 718/107 |
| 6,910,049 | B2 | * | 6/2005 | Fenton et al. | ...................... | 1/1 |
| 7,698,148 | B2 | * | 4/2010 | Lavu et al. | .................. | 702/177 |
| 2002/0010609 | A1 | * | 1/2002 | Niwa | ............................. | 705/8 |
| 2002/0013724 | A1 | * | 1/2002 | Kudo et al. | ..................... | 705/9 |
| 2002/0099499 | A1 | * | 7/2002 | Takayama et al. | ........... | 701/200 |
| 2002/0177442 | A1 | * | 11/2002 | Nagashima | ................. | 455/435 |
| 2002/0194048 | A1 | * | 12/2002 | Levinson | ....................... | 705/9 |
| 2002/0194194 | A1 | * | 12/2002 | Fenton et al. | ............ | 707/104.1 |
| 2003/0014521 | A1 | * | 1/2003 | Elson et al. | ................. | 709/225 |
| 2004/0117046 | A1 | * | 6/2004 | Colle et al. | ................... | 700/99 |
| 2004/0133889 | A1 | * | 7/2004 | Colle et al. | ................. | 718/100 |
| 2005/0060213 | A1 | * | 3/2005 | Lavu et al. | ..................... | 705/7 |

(Continued)

FOREIGN PATENT DOCUMENTS

JP    5-134989    1/1993

(Continued)

OTHER PUBLICATIONS

M M Weiss Jr. (May 2002). Scheduling—part V. Professional Builder, 67(5), 61-64.*

(Continued)

*Primary Examiner*—Romain Jeanty
*Assistant Examiner*—Gurkanwaljit Singh
(74) *Attorney, Agent, or Firm*—Finnegan, Henderson, Farabow, Garrett & Dunner, L.L.P.

(57) ABSTRACT

A context estimation rule is applied to spare time on a user's schedule, and contexts are estimated. On the basis of a task template, an input task is divided into plural subtasks. A task recommendation rule for recommending tasks to do from the relation between contexts and metadata of tasks is applied to the spare time of the user, and tasks to do in the spare time are recommended on the basis of the contexts of the spare time and the metadata of the subtasks. The recommended tasks are managed as schedules.

14 Claims, 12 Drawing Sheets

U.S. PATENT DOCUMENTS

2005/0144000 A1  6/2005  Yamasaki et al.

FOREIGN PATENT DOCUMENTS

| JP | 2000-029945 | 1/2000 |
|---|---|---|
| JP | 2001-092878 | 4/2001 |
| JP | 2003-203084 | 7/2003 |
| JP | 2004-213447 | 7/2004 |

OTHER PUBLICATIONS

Employer communications must consider different employee groups to reach entire work force. (Aug. 1998). Employee Benefit Plan Review, 53(2), 22-24.*

Gannon, Alice. (1994). Project management: An approach to accomplishing things. ARMA Records Management Quarterly, 28(3), 3.*

Crisp, Charles Bradley (2003). Control enactment in global virtual teams. Ph.D. dissertation, The University of Texas at Austin, United States—Texas.*

Leslie A Perlow. (1998). Boundary control: The social ordering of work and family time in a high-tech corporation. Administrative Science Quarterly, 43(2), 328-357.*

Maximizing Success in Lean Project Management Leadership (Presentation Supporting Paper) Travis Huber. IIE Annual Conference. Proceedings. Norcross: 2002. p. 1 (10 pages).*

Christian Timpe. (2002). Solving planning and scheduling problems with combined integer and constraint programming*. OR Spectrum, 24(4), 431-448.*

Final Notice of Rejection mailed Dec. 2, 2008 in Japanese Patent Application No. 2004-347105 (6 pages including translation).

A.K. Dey et al., "Towards a Better Understanding of Context and Context-Awareness", GVU Technical Report, 1999, GIT-GVU-99-22, College of Computing, Georgia Institute of Technology, GA.

Mari Korkea-Aho, "Context-Aware Applications Survey," Apr. 2000, available at www.hut.fi/~mkorkeaa/doc/context-aware.html.

Notification Of Reasons for Rejection mailed Sep. 16, 2008 in Japanese Patent Application No. 2004-347105 (7 pages).

* cited by examiner

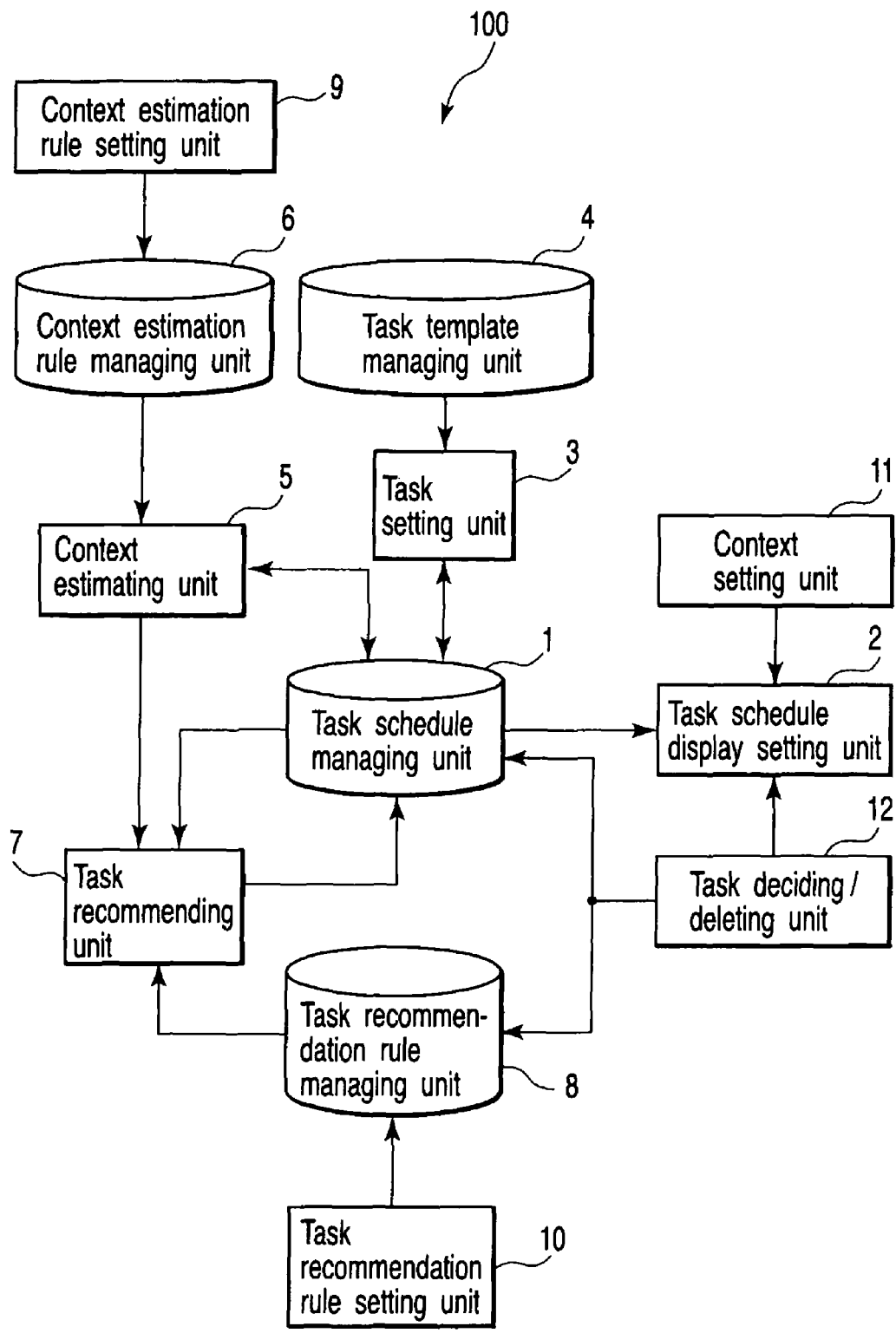
F I G. 1

| Task name | Sub task | Type | Closing date and time |
|---|---|---|---|
| Preparing thesis | Planning | Consideration | -25 days |
| | Writing | Description | -14 days |
| | Applying for release | Procedure | -14 days |
| | Submitting | Procedure | -0 day |
| | | | |

| | Time zone | Duty | Hungry | Sleepiness |
|---|---|---|---|---|
| 0:00 | | | Hungry | |
| | Morning | | | |
| | AM | On duty | | |
| 12:00 | | | Hungry | |
| | PM | Break | | |
| | | On duty | | Sleepy |
| | Evening | | Hungry | |
| 24:00 | | | | |

FIG. 7A

| | Duty | Working place |
|---|---|---|
| Mon | Working day | Head office |
| Tue | | |
| Wed | | Factory |
| Thu | | Head office |
| Fri | | |
| Sat | Holiday | |
| Sun | | |

FIG. 7B

| Schedule type | Context | Duration time |
|---|---|---|
| Meal | Full stomach | 2 hours |
| Going out | Moving | 3 hours |
| Meeting | Fatigue | 1 hour |

FIG. 10

| Type | Incompatible context |
|---|---|
| Feeling of full stomach | Full stomach, hungry |
| Place | Moving, on duty, at home |
| Physical condition | Fatigued, refreshed |

FIG. 11

| Task type \ Context | Moving | AM | Office |
|---|---|---|---|
| Consideration | 0.4 | 0.6 | 0.3 |
| Description | 0.0 | 0.5 | 0.8 |
| Procedure | 0.0 | 0.0 | 1.0 |

FIG. 12

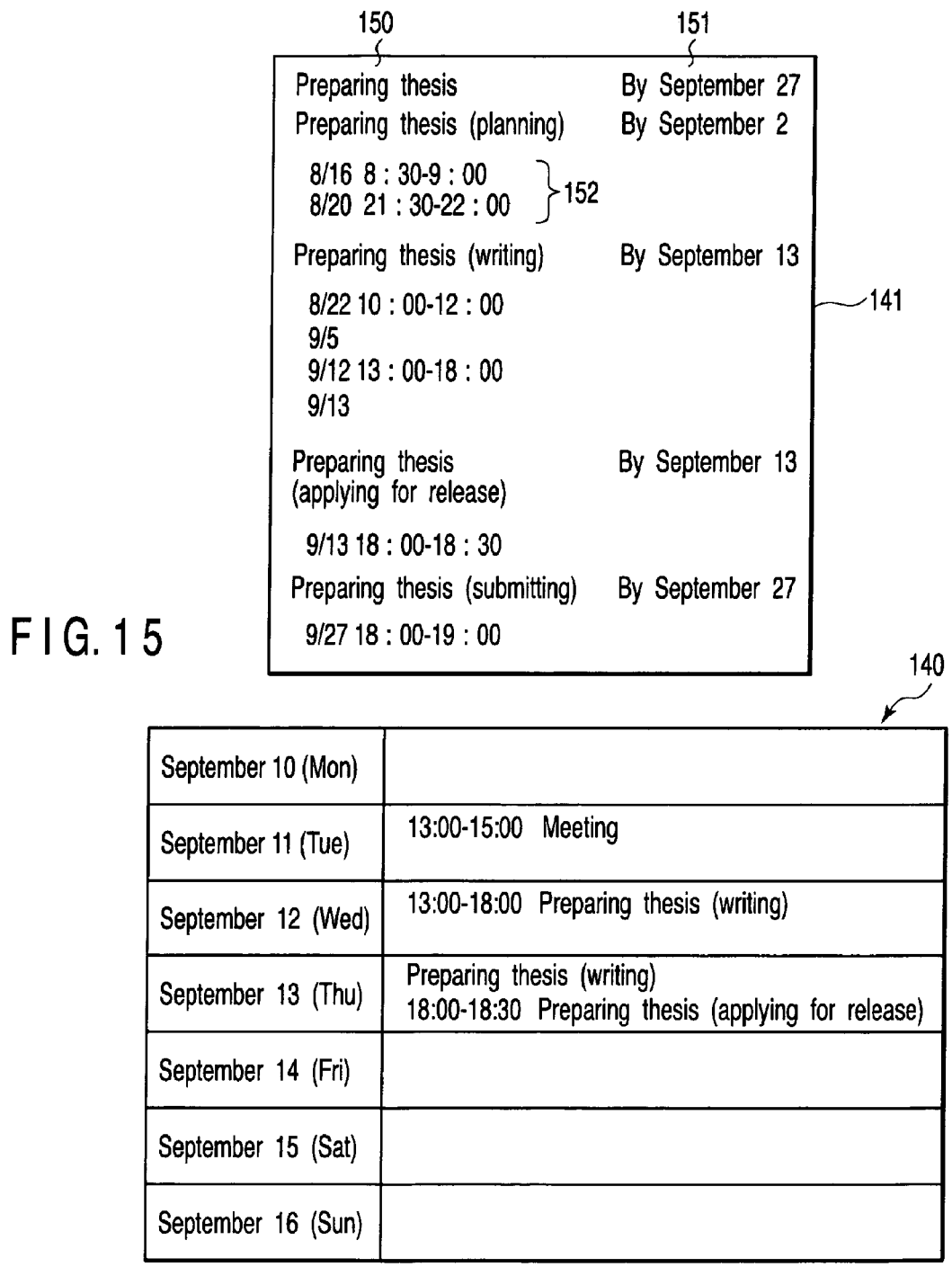
FIG. 15
FIG. 16
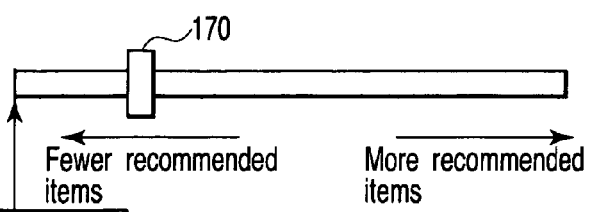
FIG. 17

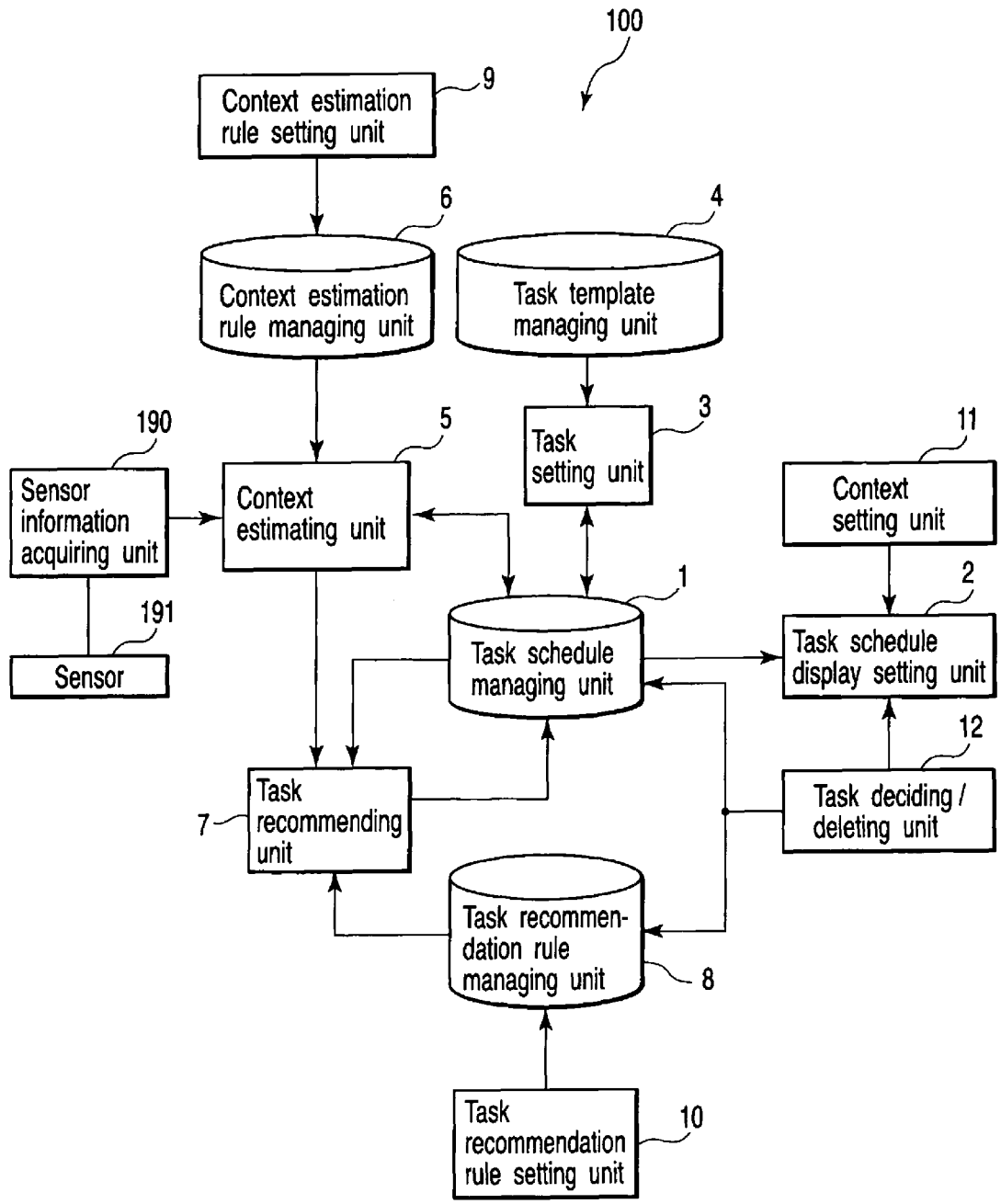
F I G. 19

| Place | Latitude | Longitude | Gateway address |
|---|---|---|---|
| Head office | 36° 25 | 139° 12 | 111.122.48.1 |
| Factory | 36° 33 | 139° 15 | 111.121.56.1 |
| Home | 36° 27 | 139° 17 | |

SCHEDULE MANAGEMENT APPARATUS, SCHEDULE MANAGEMENT METHOD AND PROGRAM

CROSS-REFERENCE TO RELATED APPLICATIONS

This application is based upon and claims the benefit of priority from prior Japanese Patent Application No. 2004-347105, filed Nov. 30, 2004, the entire contents of which are incorporated herein by reference.

BACKGROUND OF THE INVENTION

1. Field of the Invention

The present invention relates to a schedule management apparatus, schedule management method and program for managing user's schedules and tasks (to-do list).

2. Description of the Related Art

As a schedule management apparatus for managing user's schedules and tasks (to-do list), there are conventionally known, for example, a devices that automatically sets tasks according to move destinations when a user moves (Jpn. Pat. Appln. KOKAI Publication No. 2000-29945), and a device that automatically adds related information to schedule items input by a user (Jpn. Pat. Appln. KOKAI Publication No. 2003-203084).

However, all the conventional schedule management apparatuses mentioned above just enable to set and display merely time limits of tasks, and do not enable to automatically set scheduled date and time and the like for executing a task. In other words, they have failed to associate tasks with schedules without necessity for user's explicit setup and input.

In the conventional schedule management apparatus that enables to set and display merely time limits of tasks, task (to-do list) items which have been set and input by a user as things to do are managed independently from schedule items that the user has set and input separately. For this reason, the device cannot prompt the user to pay attention to the tasks whose time limits are near at hand on its schedule view, and cannot perform effective supports for the user to start and achieve the tasks without missing chances, which has been a problem with the prior art.

BRIEF SUMMARY OF THE INVENTION

Accordingly, an object of the present invention is to provide a schedule management apparatus, schedule management method and program that enable for a user to effectively perform schedule management of tasks by recommending tasks to do in spare time on a schedule in accordance with the user's contexts (conditions).

BRIEF DESCRIPTION OF THE SEVERAL VIEWS OF THE DRAWING

FIG. 1 is a block diagram showing a schedule management apparatus according to an embodiment of the present invention;

FIGS. 7A and 7B are views each showing an example of a context estimation rule by date and time or day of the week;

FIG. 10 is a view showing an example of a table for managing schedule types and contexts that the types generate, and duration hours of the contexts;

FIG. 11 is a view showing an example of a table for managing incompatible contexts;

FIG. 12 is a view showing an example of a task recommendation rule;

FIG. 15 is a view showing an example of a task view;

FIG. 16 is a view showing an example of a schedule view;

FIG. 17 is a view showing a slider of the task schedule display setting unit 2;

FIG. 19 is a block diagram showing a schedule management apparatus according to another embodiment of the present invention;

DETAILED DESCRIPTION OF THE INVENTION

Figures 2, 3:
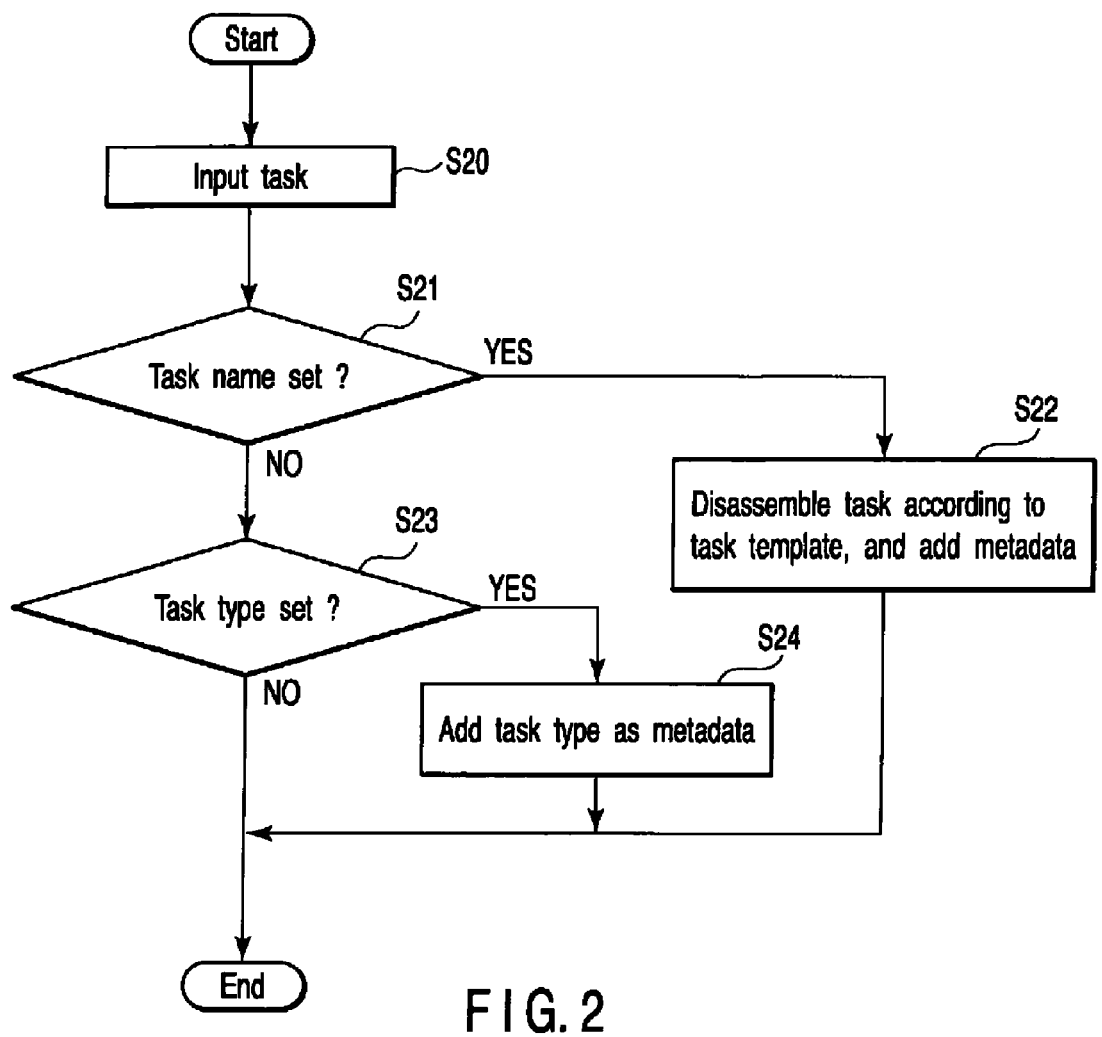
FIG. 2 is a flowchart showing an operation procedure for disassembling a task into subtasks and adding metadata thereto.
FIG. 3 is a view showing an example of a user interface for inputting a task.

Embodiments of the present invention will be explained in more details with reference to the accompanying drawings hereinafter.

FIG. 1 is a block diagram showing a schedule management apparatus according to an embodiment of the present invention. The schedule management apparatus 100 is a device for managing user's tasks (to-do list) and schedules, and may be embodied by use of a computer.

As shown in FIG. 1, the schedule management apparatus 100 includes a task schedule managing unit 1, a task schedule display setting unit 2, a task setting unit 3, a task template managing unit 4, a context estimating unit 5, a context estimation rule managing unit 6, a task recommending unit 7, a task recommendation rule managing unit 8, a context estimation rule setting unit 9, a task recommendation rule setting unit 10, a context setting unit 11, and a task deciding/deleting unit 12.

The invention may also be embodied as a program that causes a computer to function as the schedule management apparatus 100. In this case, a program according to the invention is stored in a program storage device in a computer. The program storage device is, for example, a nonvolatile semiconductor storage device or a magnetic disk device. The above program is read to a random access memory (RAM) under control of a CPU (not shown) therein, and executed by the CPU, thereby it is possible to cause a computer to function as a schedule management apparatus. Meanwhile, into this computer, an operating system that manages various computer resources, and provides file systems, various communication functions, a graphical user interface (GUI) and the like is also introduced.

The task schedule display setting unit 2 is a user interface that a user of the schedule management apparatus 100 of the embodiment uses for setting tasks and schedules. The task schedule display setting unit 2 displays the contents of the tasks and schedules set by the user, or displays the contents of tasks recommended by the device. Details of such a user interface will be explained later with reference to FIGS. 14, 15, 16 and 17.

The task schedule managing unit 1 stores and manages tasks and schedules set by the user through the task schedule display setting unit 2, and schedules recommended by the task recommending unit 7.

In the present embodiment, an item wherein no scheduled date and time of performance is set, and an item wherein only an achievement time limit is set are each referred to as a "task", and an item wherein a concrete scheduled date and time of performance is set is referred to as a "schedule", so that these terms are clearly distinguished from each other. Information for distinguishing whether it has been set by the user or it has been recommended by the device is added to each of the schedule and the task. To an item recommended by the schedule management apparatus 100, a level of importance of the item that the device estimates is added. A method of setting a task will be explained later with reference to FIG. 3.

The task setting unit 3 checks a task input by the user. If a task name is added to the task, the task template managing unit 4 stores the task, and divides the task into further finer tasks (subtasks) by use of a task template that the task template managing unit manages. The task template is a template listing up lines of subtasks showing what subtasks must be done to perform a certain task. A method of dividing a task will be explained later with reference to FIG. 2.

The task template managing unit 4 stores and manages the task template for dividing a task. The task template will be explained later with reference to FIG. 4.

The context estimating unit 5 estimates a spare time block in a schedule and contexts of the user in the spare time block by use of tasks and schedules stored and managed by the task schedule managing unit 1, and rules stored in the context estimation rule managing unit 6. Contexts are provided to show various conditions in a certain time zone of the user including "now on duty", "in meeting", "at station" and "now hungry". How to estimate contexts in a scheduled spare time block of the user (i.e., user's conditions in a spare time block) will be explained later with reference to FIG. 6.

The context estimation rule managing unit 6 stores and manages rules that the context estimating unit 5 uses to estimate contexts of the user. A level of importance is added to each of the rules. An example of the rule will be explained later with reference to FIGS. 10, 11 and 7.

The task recommending unit 7 recommends tasks to do in a spare time block by use of the spare time block and contexts thereof informed by the context estimating unit 5, tasks informed by the task schedule managing unit 1, and rules stored in the task recommendation rule managing unit 8. A method of recommending a task will be explained later with reference to FIG. 5.

The task recommendation rule managing unit 8 stores and manages rules showing what tasks should be recommended to a spare time block of a certain context, the rules being necessary for the task recommending unit 7 to recommend tasks.

A level of importance is added to each of the rules. An example of the rule will be explained later with reference to FIG. 12.

The task deciding/deleting unit decides or deletes the tasks that the user displays on the task schedule display setting unit 2, and in addition, changes the levels of importance of the rules stored in the task recommendation rule managing unit 8. A method of changing the levels will be explained later with reference to FIG. 18.

The context estimation rule setting unit 9 is a user interface for the user of a scheduler to select and adjust the rules stored in the context estimation rule managing unit 6. Details of the user interface concerned will be explained later with reference to FIG. 8.

The task recommendation rule setting unit 10 is a user interface for the user to select and adjust the rules stored in the task recommendation rule managing unit 8. Details of the user interface concerned will be explained later with reference to FIG. 13.

The context setting unit 11 is a user interface for the user to explicitly set the user's contexts at or at and after the time, to a specific schedule displayed on the task schedule display setting unit. Details of the user interface concerned will be explained later with reference to FIG. 9.

Figure 6:
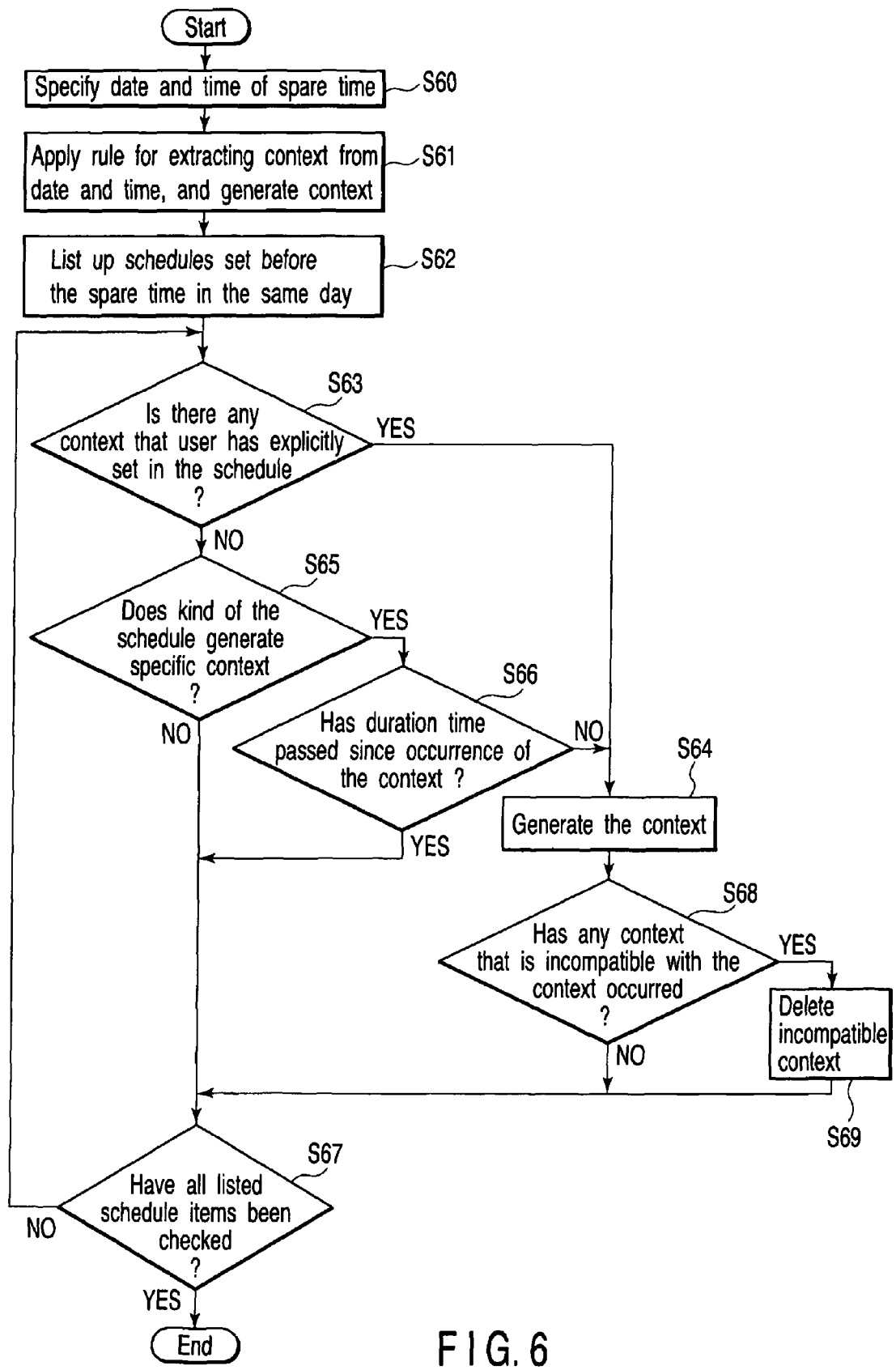
FIG. 6 is a flowchart showing an operation procedure for estimating a context of a certain spare time block.

Next, an operation of the schedule management apparatus of the embodiment will be explained hereinafter with reference to the flowcharts shown in FIGS. 2, 5 and 6.

FIG. 2 is a flowchart showing an operation procedure for disassembling a task input by a user into subtasks and adding metadata thereto.

First, the user inputs a task through the task schedule display setting unit 2 (step S20).

An example of a user interface for inputting a task is shown in FIG. 3. Any of a subject, a time limit, and a task name or a task type of the task may be set therein. In the column of the task name, a list of task names managed in the task template managing unit 4 is displayed in form of a pulldown menu. When the user selects and sets any of the task names from the pulldown menu (step S21=YES), the task input by the user is disassembled according to the corresponding task template, and further, metadata, that becomes necessary in recommending the subtasks according to the context, is added to the disassembled subtasks (step S22).

Figures 4, 5:
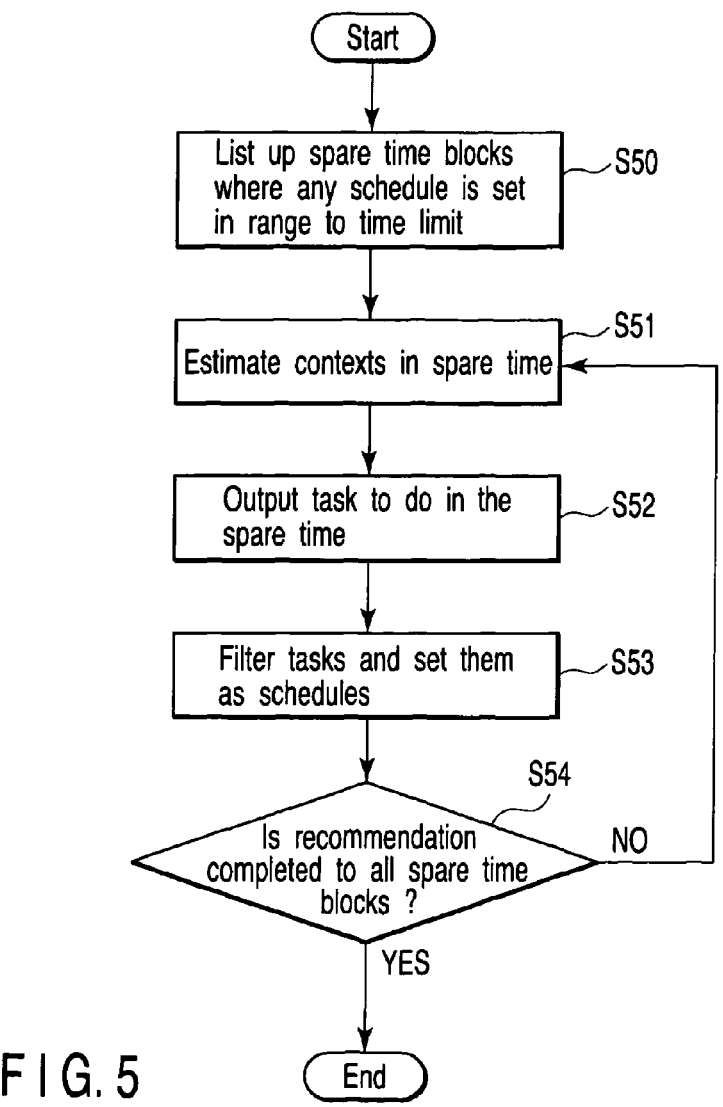
FIG. 4 is a view showing an example of a task template.
FIG. 5 is a flowchart showing an operation procedure for automatically setting a task to a spare time block where a user does not plan any schedule, and recommending the user to do the task as a schedule.

An example of the task template is shown in FIG. 4. The task template represents: a task name for uniquely identifying the task template; a subtask showing a task to do for achieving the task; a type showing a type of the task; and closing date and time showing how many days before the time limit of the task the subtask should be done. The task is not necessarily divided into plural subtasks, but may correspond to a single subtask. Among the subtasks, dependency relations showing which subtask should be done after which other subtask may be specified. The type, closing date and time, dependency relations and the like are referred to as "metadata" of the task (subtask).

When a task type is set by the user interface shown in FIG. 3, the task type is set as the metadata of the task. In the user interface in FIG. 3, other metadata than the task type may be also set. When a specific keyword is included in a text set as the subject, metadata corresponding to the keyword may be set automatically.

FIG. 5 is a flowchart showing an operation procedure that the task recommending unit 7 to automatically set each task to which metadata has been added by the operation according to FIG. 2 to a spare time block where a user does not plan any schedule, thereby recommending the user to do the task as a schedule.

First, the schedule of the user to the time limit of the input task is checked by use of the schedule set by the user and managed in the task schedule managing unit 1, and a spare time block wherein no schedule is set is listed up (step S50). Thereafter, the context estimating unit 5 estimates in what context (condition) the user is in the spare time block (step S51). The context is set to the spare time block, and then, with the spare time and the task having the metadata added thereto as an input, the task to do in the spare time block is output by use of the rules in the task recommendation rule managing unit 8 (step S52).

Meanwhile, the operation procedure in FIG. 5 is performed following to the operation in FIG. 2, but it may be configured to be automatically made in system spare time when there is no user input.

Next, with reference to the flowchart in FIG. 6, the operation procedure to estimate the context in a certain spare time block will be explained.

First, to a spare time calculated in step S50 in FIG. 5, the date and time of the spare time is specified (step S60).

Next, by application of the rule for extracting a context from date and time, the rule being set in the context estimation rule managing unit 6, the context corresponding to the date and time is generated (step S61). Examples of a context estimation rule by date and time are shown in FIGS. 7A and 7B. These examples show the correspondence of what context will occur in each time zone with respect to the context types that change by time such as "time zone", "duty", "hungry", and "sleepiness".

In addition to the contexts that change by time, contexts that change by day such as "duty" and "working place", and contexts that change by month, season, and year may be also included. In the context estimation rule managing unit 6, each rule is managed with addition of a level of importance. Accordingly, a rule may be set wherein not merely the presence or absence of a certain context, but also the degree of the context on to what degree the user is hungry are set as the level of importance, and the level of importance changes by time.

Figure 8:
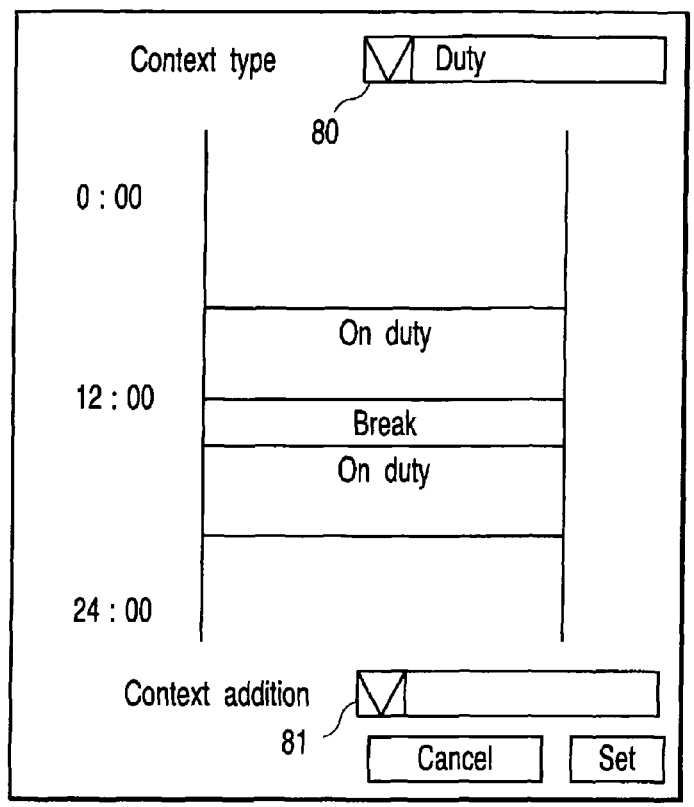
FIG. 8 is a view showing an example of a user interface provided by a context estimation rule setting unit 9.

It is supposed that how the context and the level of importance thereof change may vary depending on users. Therefore, it is preferable that the context estimation rule setting unit 9 can set and change the rule set per user. An example of a user interface provided by the context estimation rule setting unit 9 for this purpose is shown in FIG. 8. The context type may be selected from a pulldown menu 80, and the context to be set to each time zone may be selected from a context additional pulldown menu 81. The selected context is displayed on a timetable, and the user can change the time range of the context.

As described in reference document 1 "Dey, A. K. and Abowd, G. D. (1999). Toward a better understanding of context and context-awareness. GVU Technical Report GIT-GVU-99-22, College of Computing, Georgia Institute of Technology.", the term "context" means information of any kind that can be used to characterize conditions of a certain entity, and the term "entity" means a person, place, or matter and user and application itself that are considered to be related with interaction between a user and an application. As described in reference document 2 "Context-Aware Applications Survey www.hut.fi/~mkorkeaa/doc/context-aware-.html", most of information usable when interaction is performed may be called context information. For example, there are personality, space information (example: place, orientation, speed, acceleration), time information (example: hour, day, month, year, season), environment information (example: temperature, atmospheric environment, light level, noise level), social living conditions (example: person to be with, person to be nearby), peripheral resources (example: accessible device, host), resource availability (example: battery, display, network, band width), physical information (example: blood pressure, pulse, respiration rate, muscle action, tone of voice), activities (example: speaking, reading, walking, running), and a schedule table.

Now back to FIG. 6, the operation procedure on and after step S62 will be explained.

After the context corresponding to date and time is generated in step S61, schedules set before the spare time block in the same day are listed (step S62). When the context explicitly set by the user is set to any of the listed schedules, the context is generated as the context of the spare time block (step S63=YES, step S64).

When the kind is set to the schedule and the kind is instructed to generate a specific context, and the spare time is contained in the time when the context continues, in other words, when the duration time has not passed since the occurrence of the context, the context is generated (step S65=YES, step S66=NO, step S64).

Figure 9:
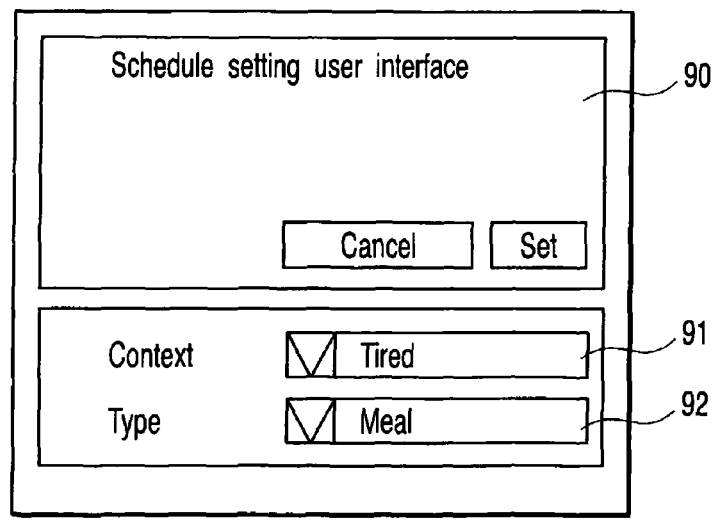
FIG. 9 is a view showing an example of a user interface of a context setting unit 11 for a user to set contexts and types to a schedule.

FIG. 9 shows an external appearance of the user interface of the context setting unit 11 for the user to set contexts and types to schedules. The user interface has a schedule setting user interface 90 for setting the subject and time zone of the schedule, and pulldown menus 90, 91 for setting the user's contexts and types. Contexts and types are explicitly set by the user through the user interface, and also may be estimated by the device from the subject and the like.

FIG. 10 is a view showing an example of a table for managing schedule types and contexts that the types generate, and duration hours of the contexts, which are managed in the context estimating unit 5. For example, after the schedule wherein the type "meal" is set, a context "full stomach" occurs for two hours.

After the context is generated in step S61 or step S64, it is checked whether or not a context that is incompatible with the context has occurred (step S68).

FIG. 11 shows an example of a table for managing incompatible contexts. In this table, context types and incompatible contexts are stored so as to be associated with each other. As shown in the figure, for example, in the context type "feeling full", the context "full stomach" and the context "hungry" are incompatible. By referring to this table, if the context "hungry" has already occurred at the moment of occurrence of the context "full stomach", the context "hungry" is deleted (step S69). As priorities of contexts in the case of occurrence of incompatible contexts, it is preferable to make the context set by the user highest, and next, the context that has occurred from type and the context that has generated from date and time lowest. It is preferable to set higher priority to contexts whose occurrence time zone is later.

The above processing procedures are performed to all the listed schedule items, and thereby the contexts of the spare time are estimated (step S67).

An example of a task recommendation rule is shown in FIG. 12. The task recommendation rule shows a task having what metadata (for example, task type) should be recommended at what level of importance in a spare time block of a certain context. When plural contexts are added to the spare time block, or plural task types are added to the task, the level of importance to recommend the task is set by use of the average of corresponding levels of importance. The levels of importance to be calculated may be obtained by not an average but a total sum. When a level of importance is set to the context, the level of importance of task recommendation is calculated by adding up the level of importance of the context and the level of importance set to the rule.

Information on what rule the task has been recommended is stringed to the recommended task. The information is used by the task deciding/deleting unit.

A task recommendation rule using other metadata set to a task, such as a rule wherein, in consideration of the closing date and time of the task, recommendation is made on the date and time before the closing date and time, may be set.

The task recommending unit 7 performs filtering of the plural tasks recommended with addition of the level of importance by use of their levels of importance, and sets them as schedules to be done in the spare time block (step S53, FIG. 5). The filtering is performed by a method of adopting a specified number of tasks in the order of high level of importance from among the tasks, a method of setting half of a specified number of tasks in the order of level of importance, and the remaining half at random, and the like. Operations of recording what tasks have been recommended in the day, and thereby avoid recommending the same task in repetition may be also performed.

Figure 13:
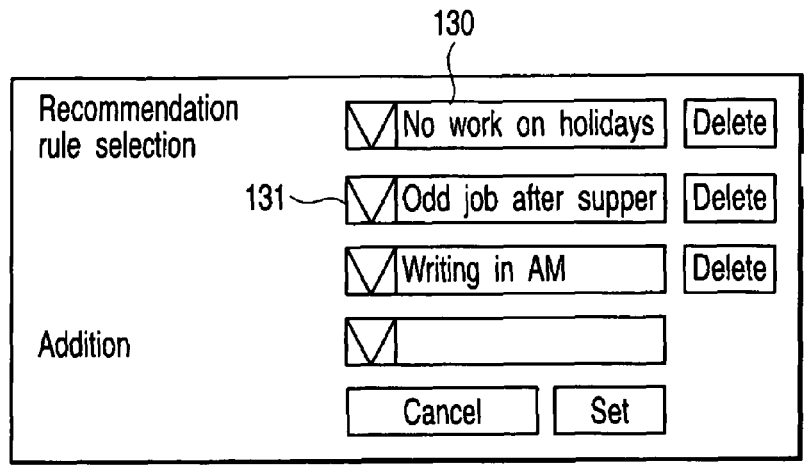
FIG. 13 is a view showing an example of a user interface of a task-recommendation rule setting unit 10.

The task recommendation rule may be set differently depending on users. FIG. 13 shows an external appearance of a user interface of the task recommendation rule setting unit 10 that sets the task recommendation rule. In the portion of recommendation rule selection, some items for changing the recommendation rule settings may be selected. For example, when an item 130 "no work on holidays" is selected, the levels of importance of the rule for extracting task types related with work are set to zero, or a negative value in the case when the context of the recommendation rule is a holiday. When an item 131 "odd job after supper" is selected, the level of importance of the rule to recommend odd job is raised in the context after supper. Operations to add a specific recommendation rule according to a selected item may also be performed. The above processing procedures are performed until the recommendation of tasks to all the spare time blocks is completed (step S54, FIG. 5).

Figure 14:
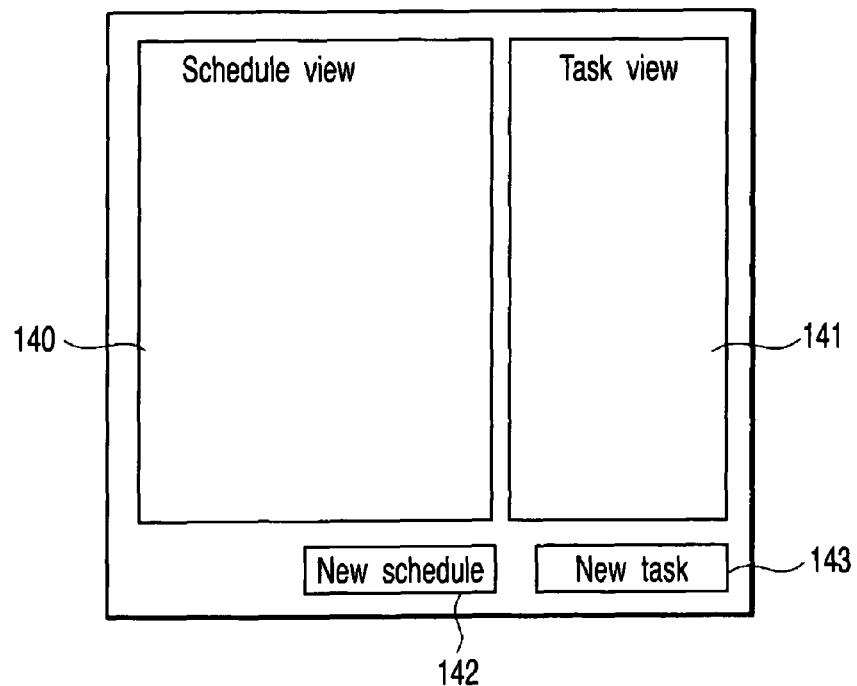
FIG. 14 is a view showing an example of a user interface of a task schedule display setting unit 2.

Tasks recommended as schedules are displayed on the task schedule display setting unit 2. FIG. 14 shows an external appearance of the task schedule display setting unit 2. The task schedule display setting unit 2 includes a schedule view 140 that displays schedules, and a task view 141 that displays tasks. Further, the unit has a schedule new addition button 142, and a task new addition button 143. When the task new addition button 143 is pressed, the user interface shifts to the user interface shown in FIG. 3. When the schedule new addition button 142 is pressed, the user interface shifts to the user interface shown in FIG. 9. Schedules and tasks may be color-coded according to information whether the items are set by the user, or recommended by the device.

An example of the task view is shown in FIG. 15. In the task view, task and subtask subject 150 (in the case of a subtask, the subject of the original task and the task type of the subtask become the subject), and the time limit thereof 151 are displayed. In the case when the date and time for a task is recommended as a schedule, the date and time 152 is displayed. In order to make clear from what task a certain subtask has been derived, they may be displayed in the same system color.

FIG. 16 shows an example of the schedule view. In addition to schedules set by the user, tasks recommended as schedules are displayed thereon. In order to show that the tasks displayed on the task view 141 and the tasks recommended as schedules on the schedule view 140 are the same tasks, the tasks on the respective views may be displayed in the same color, or when the tasks on either of the views are selected, the tasks on the view not selected may be highlighted.

Since levels of importance are added to respective schedules and tasks, the shade of colors to be displayed may be varied according to these levels of importance. A slider 170, as shown in FIG. 17, for setting threshold values of levels of importance of items to be displayed may be provided at the task schedule display setting unit 2, and items to be displayed may be changed according to set threshold values. In the slider 170 shown in FIG. 17, the threshold value decreases as the slider is moved to the right, and many recommended items including items of low levels of importance are displayed. When the slider 170 is moved to the left, the threshold value increases, and the number of recommended items to be displayed decreases. When the slider is set to the far left, none of the recommendation items are displayed, and only the items set by the user are displayed.

Figure 18:
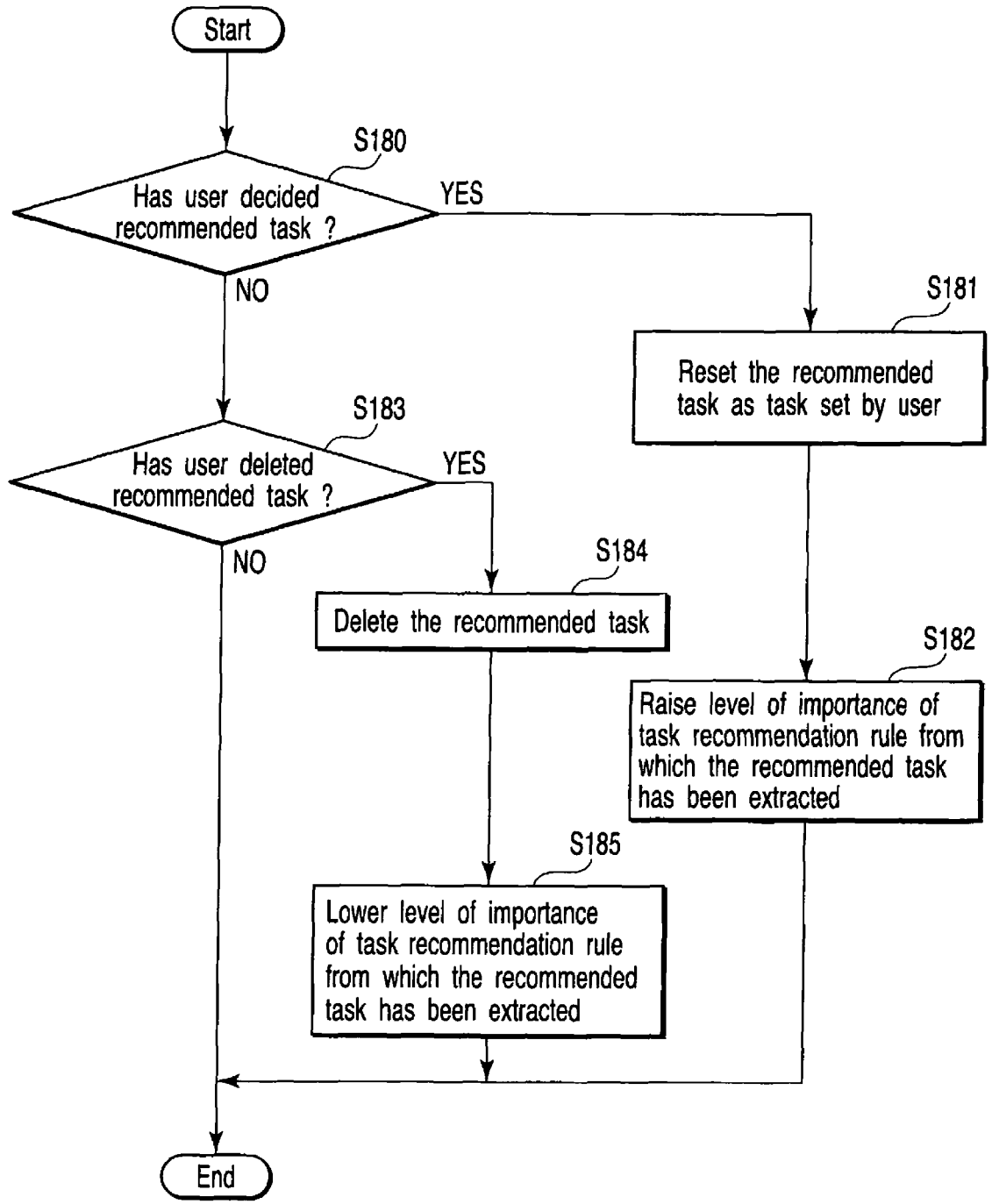
FIG. 18 is a flowchart showing an operation procedure for a user to decide or delete a recommended task.

Next, with reference to the flowchart in FIG. 18, the operation procedure for the user to decide or delete a recommended task will be explained.

The user may select a recommended task set as a schedule in the schedule view 140 or the task view 141, and decide or delete the recommended task.

When the user decides a recommended task (step S180=YES), the recommended task is reset as a task set by the user (step S181). By use of information showing from what rule the task has been recommended, the information being stringed with the recommended task, the level of importance of the task recommendation rule from which the recommended task has been extracted is raised (step S182).

On the other hand, when the user deletes a recommended task (step S183=YES), the schedule corresponding to the recommended task is deleted from the task schedule managing unit 1 (step S184), and the level of importance of the task recommendation rule from which the recommended task has been extracted is lowered (step S185).

Next, with reference to FIG. 19, another embodiment of the present invention will be explained hereinafter. In this embodiment, a sensor information acquiring unit 190 is added to the schedule management apparatus 100 shown in FIG. 1. The sensor information acquiring unit 190 is connected to a sensor 191 for detecting information signals from the outside. The sensor information acquiring unit 190 estimates a context from sensor information by use of, for example, a table shown in FIG. 20. The sensor information includes, for example, "latitude", "longitude", "gateway address" and the like, and a context "place" is estimated from these items of information. When the latitude and longitude acquired from a GPS enter a specific range from the values listed in the table, or when an accessible gateway address meets the values listed in the table at a connection to a hotspot by use of a wireless LAN, it is determined that the user is at the corresponding place.

Figures 20, 21:
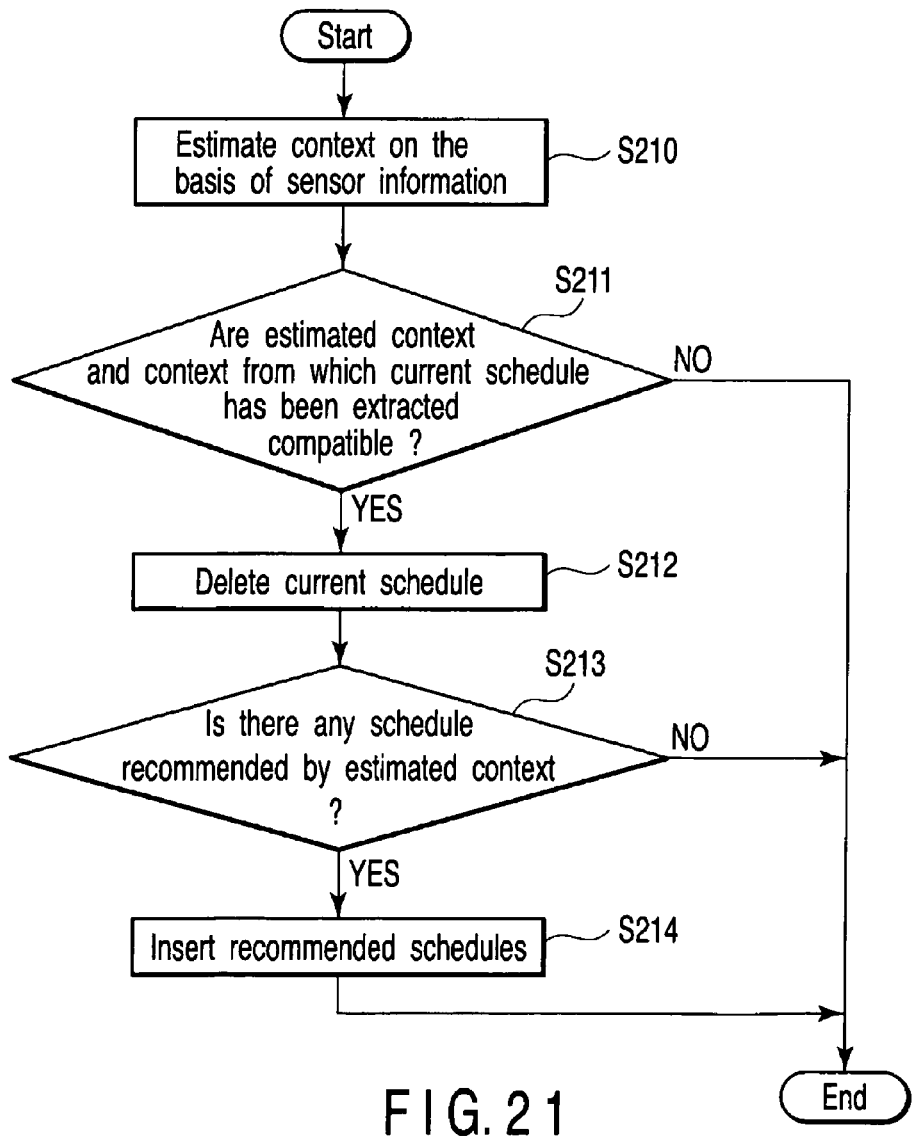
FIG. 20 is a view showing an example of information to be acquired by a sensor information acquiring unit.
FIG. 21 is a flowchart showing an operation procedure of another embodiment of the present invention.

In the present embodiment, the context estimating unit 5 and the task recommending unit 7 process the sensor information acquired by the sensor information acquiring unit 190 in accordance with an operation procedure shown in the flowchart in FIG. 21. More specifically, the context estimating unit 5 estimates a context on the basis of the sensor information as described above (step S210). Herein, it is determined whether or not the context estimated in step S210 and the context from which the current schedule has been extracted are compatible (step S211), and if they are not compatible, the current schedule is deleted (step S212). Next, schedules to be recommended for the context estimated in step S20 are searched for (step S213), and if they are obtained, they are inserted (step S214).

As explained heretofore, by automatically setting and displaying the date and time of a task in accordance with a context, it is possible to prompt the user to perform the task at an appropriate date and time before its time limit, thereby preventing tasks to be done from being forgotten and left undone. Operations of deciding and deleting tasks are used as feedback data through changes of the levels of importance of rules in the device, and accordingly, it is possible to realize operations suitable for each user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A schedule management apparatus for managing user's schedules and tasks, comprising:
   a context estimation rule storage device which stores a context estimation rule for use in estimation of contexts of spare time blocks, wherein the context estimation rule is used to generate a context by applying the context estimation rule to the spare time blocks and the context estimation rule generates contexts corresponding to schedule types before spare time blocks whose contexts are estimated, and wherein
   the generated context varies based on dates and times of the spare time blocks and
   the generated context indicates conditions of the user;
   a listing device configured to list spare time blocks when there is no schedule set by the user;
   a context estimation device configured to apply the context estimation rule to the listed spare time blocks, thereby estimating contexts of the spare time blocks;
   a task template storage device which stores a task template that represents tasks and subtasks associated with the tasks, the task template including respective metadata of the subtasks;
   a task input device which inputs a task;
   a dividing device configured to divide the task input by the task input device into the associated subtasks based on the task template;
   a task recommendation rule storage device which stores a task recommendation rule for recommending tasks to do in accordance with the relation between contexts and metadata of tasks;
   a task recommendation device configured to apply the task recommendation rule to the listed spare time blocks, and to recommend tasks to do in the spare time blocks on the basis of the contexts of the spare time blocks and the metadata of the subtasks;
   a task schedule management device configured to manage recommended tasks as schedules; and
   a computer processor that executes the schedule management apparatus.

2. A schedule management apparatus according to claim 1, further comprising:
   a sensor information acquisition device which acquires information from a sensor, wherein the context estimation device estimates contexts on the basis of the information.

3. A schedule management apparatus according to claim 2, wherein the sensor detects information signals including one of latitude, longitude, and gateway address, from the outside, and the sensor information acquisition device estimates a place-context on the basis of the information signals.

4. A schedule management apparatus according to claim 1, further comprising:
   a device to delete one of contexts that cannot occur at the same time.

5. A schedule management apparatus according to claim 1, further comprising:
   a device which sets a level of importance to the task recommendation rule.

6. A schedule management apparatus according to claim 1, further comprising:
   a schedule view to display schedules;
   a task view to display tasks; and
   a view control device configured to control the views to display the tasks recommended by the task recommendation device as schedules on the schedule view, and display the tasks recommended by the task recommendation device together with scheduled date and time on the task view.

7. A schedule management method for managing user's schedules and tasks, comprising:
   storing a context estimation rule for use in estimation of contexts of spare time blocks, wherein the context estimation rule is used to generate a context by applying the context estimation rule to the spare time blocks and the context estimation rule generates contexts corresponding to schedule types before spare time blocks whose contexts are estimated, and wherein
   the generated context varies based on dates and times of the spare time blocks and
   the generated context indicates conditions of the user;
   listing spare time blocks when there is no schedule set by the user;
   applying the context estimation rule to the listed spare time blocks, thereby estimating contexts of the spare time blocks;
   storing a task template that represents tasks and subtasks associated with the tasks, the task template including respective metadata of the subtasks;
   inputting a task;
   dividing the task into the associated subtasks based on the task template;
   storing a task recommendation rule for recommending tasks to do in accordance with the relation between contexts and metadata of tasks;
   applying, by a computer processor, the task recommendation rule to the listed spare time blocks, and recommending tasks to do in the spare time blocks on the basis of the contexts of the spare time blocks and the metadata of the subtasks; and
   managing the recommended tasks as schedules.

8. A schedule management method according to claim 7, further comprising:
   acquiring information from a sensor; and
   estimating contexts on the basis of the information from the sensor.

9. A schedule management method according to claim 8, wherein said acquiring includes detecting information signals including one of latitude, longitude, and gateway address, from the outside, and said estimating includes estimating a place-context on the basis of the information signals.

10. A schedule management method according to claim 7, further comprising:
    deleting one of contexts that cannot occur at the same time.

11. A schedule management method according to claim 7, further comprising:
    setting a level of importance to the task recommendation rule.

12. A schedule management method according to claim 7, further comprising:
 displaying recommended tasks as schedules on a schedule view, and displaying the tasks together with scheduled date and time on a task view.

13. A schedule management method according to claim 7, wherein the context estimation rule generates a context of a spare time following a specific schedule, wherein the context has a specific duration of time.

14. A schedule management program for managing user's schedules and tasks, stored in a non-transitory computer readable medium, the program comprising computer-executable instructions for causing a computer to execute:
 storing a context estimation rule for use in estimation of contexts of spare time blocks, wherein the context estimation rule is used to generate a context by applying the context estimation rule to the spare time blocks and the context estimation rule generates contexts corresponding to schedule types before spare time blocks whose contexts are estimated, and wherein
 the generated context varies based on dates and times of the spare time blocks and
 the generated context indicates conditions of the user;
 listing spare time blocks when there is no schedule set by the user;
 applying the context estimation rule to the listed spare time blocks, thereby estimating contexts of the spare time blocks;
 storing a task template showing that represents tasks and subtasks associated with the tasks, the task template including respective metadata of the subtasks;
 inputting a task;
 dividing the task into the associated subtasks based on the task template;
 storing a task recommendation rule for recommending tasks to do in accordance with the relation between contexts and metadata of tasks;
 applying the task recommendation rule to the listed spare time blocks, and recommending tasks to do in the spare time blocks on the basis of the contexts of the spare time blocks and the metadata of the subtasks; and
 managing the recommended tasks as schedules.

\* \* \* \* \*

UNITED STATES PATENT AND TRADEMARK OFFICE
CERTIFICATE OF CORRECTION

| | | |
|---|---|---|
| PATENT NO. | : 7,818,197 B2 | Page 1 of 1 |
| APPLICATION NO. | : 11/289535 | |
| DATED | : October 19, 2010 | |
| INVENTOR(S) | : Cho et al. | |

It is certified that error appears in the above-identified patent and that said Letters Patent is hereby corrected as shown below:

Claim 14, column 12, line 7, change "task template showing" to --task template--.

Signed and Sealed this
Fourth Day of January, 2011

David J. Kappos
*Director of the United States Patent and Trademark Office*